United States Patent [19]

Sheridan

[11] 4,016,439

[45] Apr. 5, 1977

[54] MAGNETICALLY ACTIVATED OSCILLATORY MOTOR

[76] Inventor: Francis R. Sheridan, 302 - 2nd Ave., Puyallup, Wash. 98371

[22] Filed: Oct. 28, 1975

[21] Appl. No.: 626,473

[52] U.S. Cl. .................................... 310/39; 310/32

[51] Int. Cl.² ........................................ H02K 33/14

[58] Field of Search ................... 310/21, 22, 36-39, 310/32, 33, 31; 318/134

[56] References Cited

UNITED STATES PATENTS

| | | | |
|---|---|---|---|
| 2,636,095 | 4/1953 | Schulte | 310/39 X |
| 2,810,083 | 10/1957 | Donay | 310/39 |
| 2,833,943 | 5/1958 | Anthony | 310/32 |

*Primary Examiner*—Donovan F. Duggan
*Attorney, Agent, or Firm*—Eugene D. Farley

[57] ABSTRACT

A magnetically activated oscillatory motor comprises a pendulum pivotally mounted on mounting means, a pendulum magnet mounted on the pendulum with its poles aligned in the direction of pendulum movement, and first and second electromagnets mounted on the mounting means with their poles aligned to face like poles of the pendulum magnet. An electric circuit includes electric power means and electric switch means, which are associated with the first and second electromagnets to control the flow of current thereto. The electric switch means are mounted on the mounting means in a manner to be engaged by the pendulum when it is near the extremities of its swing to pass current to those electromagnets then adjacent the pendulum repelling the like polarity pole of the pendulum magnet. Thus the pendulum is driven downwardly alternately from the opposite ends of its swing to maintain pendulum oscillation. Drive means is connected to the pendulum to transmit its oscillatory motion to a driven member.

4 Claims, 3 Drawing Figures

3 3 53 54 21 63a 70 56 61 62 72 74 64a 66a 54a 28a 20a 18a 10 22 24 22a 25 12a 40 42 37 39 38 34 36 30 32 47 48 26 14 16a 46 50 49 52 51

MAGNETICALLY ACTIVATED OSCILLATORY MOTOR

BACKGROUND OF THE INVENTION

This invention relates to oscillatory motors and in particular to magnetically activated oscillatory motors.

Magnetically activated oscillatory motors are well known in the prior art, particularly for use in display devices. However, the prior art motors of this class have not provided a positive activation mechanism which is powered only during the driving portion of its operational cycle. Thus the prior art motors are not suited for driving certain types of devices requiring a particular input speed and creating a large load.

Accordingly, it is the general purpose of the present invention to provide a magnetically activated oscillatory motor which is simple in its construction, reliable in operation, and adaptable to driving a multiplicity of devices having a wide range of speed and power requirements.

It is a further object of the present invention to provide a magnetically activated oscillatory motor wherein the magnetic activators are powered only during the driving portion of the motor cycle.

THE DRAWINGS

The manner in which the foregoing and other objects of the invention are accomplished will be apparent from the accompanying specification and claims, considered together with the drawings, wherein:

GENERAL STATEMENT OF THE INVENTION

Figures 1, 2, 3:
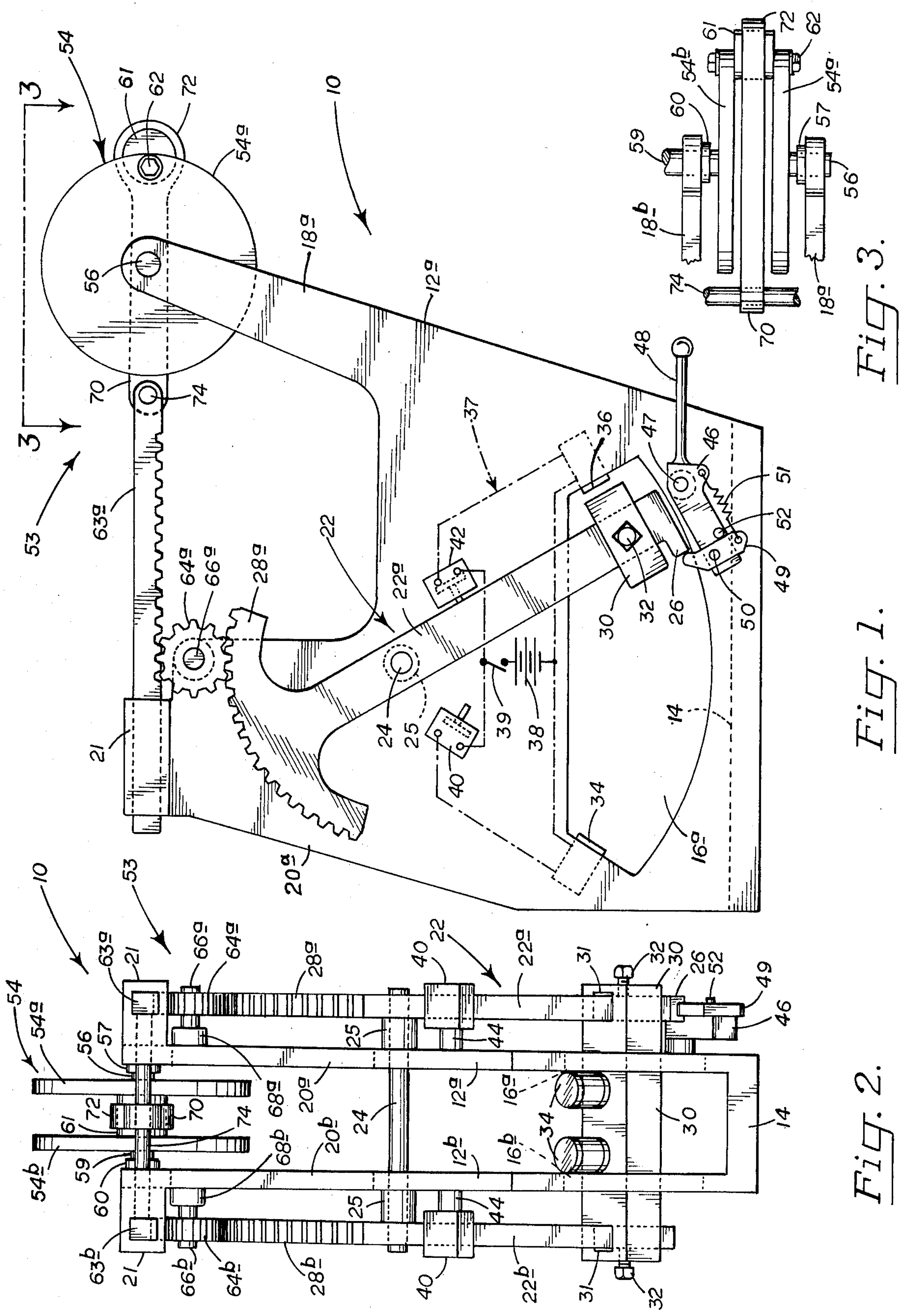
FIG. 1 is a side elevation view of the motor of the present invention.
FIG. 2 is an end elevation view of the motor of FIG. 1.
FIG. 3 is a fragmentary plan view of the motor of FIG. 1 looking in the direction of the arrows of line 3—3 of that view.

The magnetically activated oscillatory motor of the present invention broadly comprises a pendulum pivotally mounted on mounting means and a pendulum magnet mounted on the pendulum to oscillate therewith having its poles aligned in the direction of pendulum movement. First and second electromagnets are mounted to the mounting means in a fixed spaced relation, aligned with their poles facing the like pole of the pendulum magnet.

An electric circuit includes electric power means and electric switching means associated with the first and second electromagnets to control the flow of current thereto. The switching means are mounted on the mounting means in a manner to be engaged by the pendulum when it is near the extremities of its swing, thus alternately energizing the first and second electromagnets to repel the like polarity pole of the pendulum magnet and drive the pendulum downwardly when it reaches each end of its oscillation to maintain the motor in operation.

Drive means is connected to the pendulum to transmit the oscillatory motion created therein to a driven member.

DETAILED DESCRIPTION OF A PREFERRED EMBODIMENT

Referring to the drawings, the motor of the present invention is mounted on mounting means, such as a frame 10. The frame comprises a bifurcated structure having parallel planar sides 12*a*, 12*b* and base 14. Irregularly shaped access openings 16*a*, 16*b* are located in the lower portions of the respective sides. The upper portions of the sides include elongate flywheel-locating arms 18*a*, 18*b* and drive-locating arms 20*a*, 20*b*. Outwardly extending guides 21 are joined to the extremities of the drive-locating arms.

Pendulum 22 comprises an assembly which is mounted pivotally in the mounting means. In the embodiment illustrated, the pendulum comprises a right hand element 22*a* and a left hand element 22*b*, as viewed in FIG. 2. The pendulum is mounted freely and pivotally in the upper medial portion of sides 12*a*, 12*b* by means of shaft 24 which extends through the sides and is fastened rigidly thereto. Bearings 25 are mounted on the sides to journal the shaft. The pendulum elements are spaced outwardly from the sides of the frame so that they can swing without interference with the sides.

Latching tab 26 is located on the lower extremity of one of the elements of the pendulum.

The upper extremities of the pendulum elements comprise toothed drive gears 28*a*, 28*b*. The drive gears include circular segments with peripheral teeth. The arc of the segments depends upon the swing of the pendulum and will normally be approximately 90°–120°.

Pendulum magnet 30 is mounted on the lower extremity of the pendulum and ties both pendulum elements together. The pendulum magnet is located longitudinally on the pendulum at a position to allow its passage across the openings 16*a*, 16*b* of the sides of the frame when the pendulum oscillates. The pendulum magnet is of the permanent type in the embodiment illustrated. However, an electromagnet could also be utilized for this purpose.

Slots 31 in each end of the pendulum magnet receive pendulum elements 22*a*, 22*b*. Preferably, the slots are configured to allow the pendulum magnet to slide freely along the pendulum to adjust the period of the oscillatory cycle of the pendulum. Thus the output speed of the motor may be changed. Set screws 32 fit into threaded holes at each end of the pendulum magnet to engage the pendulum frictionally allowing attachment of the pendulum magnet to the pendulum at a selected location.

First and second electromagnets 34, 36 are located adjacent the inner sidewalls of the frame. One of their poles projects beyond the plane of the ends of the sides of the frame defining openings 16*a*, 16*b*. They are located to position their projecting poles adjacent the pendulum magnet when the pendulum is at each end of its swing.

The poles of the first and second electromagnets are aligned opposite one another with each having poles facing the like polarity pole of the pendulum magnet. Thus when the pendulum is at either end of its swing the magnetic field of the pendulum magnet is repelled by the magnetic fields of the adjacent electromagnets to drive the pendulum back downwardly.

In the embodiment illustrated two first and two second electromagnets are employed with one of each adjacent side 12*a* and one of each adjacent side 12*b*. The magnets are attached rigidly to the sides by means such as glue, or by mechanical fasteners.

The magnetic fields of the first and second electromagnets should be of sufficient strength that their fields of force do not exert an appreciable force on the pendulum magnet unless the pendulum magnet is within the half of the oscillatory cycle adjacent those magnets.

An electric circuit 37 includes electric power means, such as battery 38, which supplies power to activate the first and second electromagnets. A power switch 39 controls flow of current from the battery through the electric circuit.

The first electromagnets and the second electromagnets are connected to the battery by means of parallel circuits. Electric switching means, such as normally open switches 40 and 42, are included in the circuits of the first and second electromagnets respectively to interrupt the flow of current thereto. The switches are located on the sides 12*a*, 12 *b* of the frame in a manner to be engaged by the pendulum when it is near the extremities of its swing to pass current to the electromagnet then adjacent the pendulum. Thus current is passed to those electromagnets which are adjacent the pendulum magnet when the pendulum is near each extremity of its oscillation. In the embodiment illustrated two switches 40 and two switches 42 are utilized. The switches are offset from the sides of the frame by posts 44 to align them with the pendulum elements.

Latch means, such as catch 46, is attached pivotally to one side of the frame to engage latching tab 26 when the pendulum is at one extemity of its oscillation. The catch is pivotal about pin 47 between a latching position and a releasing position by operation of integral handle 48. Detent 49 is joined pivotally to the end of the catch by means of post 50 and is biased by means of spring 51 against pin 52 to a position to engage latching tab 26.

Drive means 53 is driven by the pendulum driving gears to transmit the pendulum oscillations to flywheel 54, or other driven members.

Flywheel 54 is mounted rotatably on the flywheel locating arms 18*a* and 18*b* of the frame, FIG. 3. In the embodiment illustrated the flywheel comprises spaced right hand element 54*a* and left hand element 54*b*. Each element is mounted inwardly of the respective flywheel locating arm 18*a*, 18*b*. The right hand flywheel element is mounted centrally on shaft 56 which is journaled in bearing 57 located on arm 18*a*. The left hand flywheel element is mounted centrally on shaft 59 which is journaled in bearing 60 on locating arm 18*b*. Shaft 59 extends outwardly from the flywheel to serve as a power take-off. Journal 61 is mounted peripherally between the flywheel elements by means of bolt 62 to give eccentric movement of the journal upon rotation of the flywheel.

Racks 63*a* and 63*b*, configured to slide freely within guides 21 of the frame, are located above the drive gears 28*a* and 28*b* of the pendulum. The racks are located coplanar with the pendulum elements and are translateable freely in a plane normal to the pivotal plane of the pendulum. The racks have teeth which ace downwardly, and are spaced in the same ratio as the teeth of the drive gears. However, the racks are separated from the drive gears, leaving a space therebetween.

Idler gears 64*a*, 64*b*, configured to fit between the drive gears and the racks, are mounted rotatably on drive locating arms 20*a*, 20*b* respectively of the frame. The idler gears are mounted on shafts 66*a* and 66*b* which are journaled in bearings 68*a* and 68*b* mounted on the locating arms. Clusters of gears may be used in place of the idler gears to alter the gear ratio between the racks and the drive gears of the pendulum. Thus the output speed of the motor may be changed.

Crank 70 interconnects the flywheel and the terminal portions of the racks. The crank includes a bearing 72 at one end which receives journal 61 located between the flywheel elements. The other end of the crank rotatably receives the medial portion of a drive pin 74. The terminal portions of the drive pin are fixed in openings located in the racks at one of their extremities. Thus the eccentric location of journal 61 allows the translating motion of the racks to be transmitted through the crank to impart rotational movement to the flywheel.

To operate the device, in the first instance the pendulum is moved manually to one extremity of its swing, as shown in FIG. 1. Catch 46 is manipulated to latch the pendulum in this position.

When output is desired, current is supplied to first and second electromagnets 34 and 36 from battery 38 by closing power switch 39. Accordingly, since switches 42 are closed due to engagement with the pendulum and switches 40 are open, the second electromagnets are energized and the first electromagnets are de-energized.

Catch 46 is rotated by manipulation of handle 48 to release the pendulum. The force exerted by the magnetic fields of the second electromagnets on the like polarity pole of one end of the pendulum magnet acts to drive the pendulum positively downwardly. Preferably, the strengths of the magnets are sufficient to overcome the effect of the gravitational force on the pendulum and to drive the pendulum upwardly on the other side of its swing to a position adjacent the first electromagnets.

It will be noted that as the pendulum swings away from the second electromagnets, switches 42 are opened to break the circuit de-energizing the second electromagnets.

As the pendulum nears the opposite extremity of its swing, it engages switches 40 to energize first electromagnets 34. Since the first electromagnets are aligned with their poles reversed from those of the second electromagnets, they face the like polarity pole of the other end of the pendulum magnet. The magnetic fields of the first electromagnets thus drive the pendulum back downwardly with sufficient force to reach a position adjacent the second electromagnets again, thereby completing a cycle which will be repeated as long as power is supplied to the electromagnets.

It will be noted that as the pendulum swings away from the first electromagnets, switches 40 are opened to break the circuit de-energizing the second electromagnets.

As long as current is supplied to the electromagnets from the battery, the cycle will repeat itself, providing a low power output source of oscillatory motion through the pendulum.

As the pendulum is oscillated between the electromagnets, driving gears 28*a* and 28*b* rotate idler gears 64*a* and 64*b* first counterclockwise and then clockwise. The idler gears in turn cause racks 62*a* and 62*b* to reciprocate in guides 21.

The translating motion of the racks is transmitted to flywheel 54 through crank 70 and eccentric journal 61, and then to a driven member by means of shaft 59.

When it is desired to stop the operation of the motor, handle 48 is manipulated to move catch 46 to its latching position and switch 39 is opened to de-energize the circuit. It will be noted that latch 46 may be placed in its latching position before the pendulum is at the end of its swing. As latching tab 26 engages detent 49 the bias of spring 51 is overcome, allowing the detent to rotate and the latching tab to pass thereby. The spring then biases the detent back to its latching position to engage the latching tab.

It will be noted that the motor of the instant invention provides a continuous rotary output with only a small amount of input power required to activate the electromagnets.

The size and speed of the motor can be arranged in such a manner that it may be used to provide a clean source of low cost power for many types of driven devices, such as a generator an alternator, a metal hack saw, a stamping or die device, or any other machine requiring a reciprocating action.

In addition, the motor requires a minimum of maintenance and upkeep due to its simplicity of construction and operation.

Having thus described my invention in preferred embodiment, I claim:

1. A magnetically activated oscillatory motor comprising a. mounting means, b. a pendulum pivotally mounted to the mounting means, c. a pendulum magnet mounted on the pendulum with its poles aligned to face in the direction of pendulum movement, d. first and second electromagnets mounted on the mounting means in a fixed, spaced, relation adjacent the opposite extremities of swing of the pendulum with their poles aligned with those of the pendulum magnet and facing the like polarity pole thereof, whereby each electromagnet, when energized, functions to repel the facing pole of the pendulum magnet and urge the pendulum toward its other extremity of swing, e. electric power means for supplying current to energize the first and second electromagnets, f. switch means in an electric circuit with the electric power means and the first and second electromagnets and operative to control the flow of current selectively to the first and second electromagnets, mounted on the mounting means for engagement by the pendulum when it is near the extremities of its swing to energize only the electromagnet then adjacent to the pendulum, to effect urging of the pendulum toward its other extremity of swing, and g. drive means connected to the pendulum to transmit its oscillatory motion to a driven member.

2. A magnetically activated oscillatory motor comprising a. mounting means, b. a pendulum pivotally mounted to the mounting means, c. a pendulum magnet mounted on the pendulum with its poles aligned to face in the direction of pendulum movement, d. first and second electromagnets mounted on the mounting means in a fixed, spaced relation with their poles aligned with those of the pendulum magnet and facing the like polarity pole thereof, e. electric power means supplying current to energize the first and second electromagnets, f. switch means in an electric circuit with the electric power means and the first and second electromagnets and operative to control the flow of current to the first and second electromagnets, mounted on the mounting means for engagement by the pendulum when it is near the extremities of its swing to energize the electromagnets then adjacent to the pendulum, and g. drive means connected to the pendulum to transmit its oscillatory motion to a driven member, comprising 1. a flywheel rotatably mounted on the mounting means,
2. a power take-off shaft mounted on the flywheel,
3. racks and guides attached to the mounting means, the racks freely translating in the guides in a plane substantially normal to the pivotal plane of the pendulum,
4. a crank rotatably connecting the terminal portion of the racks eccentrically to the flywheel,
5. toothed drive gears mounted on the end of the pendulum, and
6. idler gears rotatably mounted on the mounting means, and positioned to be driven by the drive gear to translate the rack upon reciprocation of the pendulum.

3. A magnetically activated oscillatory motor comprising a. mounting means, b. a pendulum pivotally mounted to the mounting means, c. a pendulum magnet mounted on the pendulum with its poles aligned to face in the direction of pendulum movement, d. first and second electromagnets mounted on the mounting means in a fixed, spaced, relation with their poles aligned with those of the pendulum magnet and facing the like polarity pole thereof, e. electric power means for supplying current to energize the first and second electromagnets, f. switch means in an electric circuit with the electric power means and the first and second electromagnets and operative to control the flow of current to the first and second electromagnets, mounted on the mounting means for emgagement by the pendulum when it is near the extremities of its swing to energize the electromagnets then adjacent to the pendulum, g. drive means connected to the pendulum to transmit its oscillatory motion to a driven member, and h. latch means mounted on the mounting means and positioned to engage the pendulum releasably retaining it at one extremity of its swing.

4. A magnetically activated oscillatory motor comprising a. mounting means, b. a pendulum pivotally mounted to the mounting means, c. a pendulum magnet mounted on the pendulum with its poles aligned to face in the direction of pendulum movement, d. first and second electromagnets mounted on the mounting means in a fixed, spaced, relation with their poles aligned with those of the pendulum magnet and facing the like polarity pole thereof, e. electric power means for supplying current to energize the first and second electromagnets, f. switch means in an electric circuit with the electric power means and the first and second electromagnets and operative to control the flow of current to the first and second electromagnets, mounted on the mounting means for engagement by the pendulum when it is near the extremities of its swing to energize the electromagnets then adjacent to the pendulum, and g. drive means connected to the pendulum to transmit its oscillatory motion to a driven member, the drive means comprising:

1. a flywheel rotatably mounted on the mounting means,
2. a power take-off shaft mounted on the flywheel,
3. racks and guides attached to the mounting means, the racks freely translating in the guides in a plane substantially normal to the pivotal plane of the pendulum,
4. a crank rotatably connecting the terminal portion of the racks eccentrically to the flywheel,
5. toothed drive gears mounted on the end of the pendulum, and
6. idler gears rotatably mounted on the mounting means, and positioned to be driven by the drive gear and to translate the rack upon reciprocation of the pendulum.

* * * * *